United States Patent
Ottensooser et al.

(10) Patent No.: US 12,252,201 B2
(45) Date of Patent: Mar. 18, 2025

(54) ON-VEHICLE HELMET LOCK

(71) Applicants: Tamir Ottensooser, Tel Aviv (IL); Benjamin Yonatan Asseraf, Tel Aviv (IL)

(72) Inventors: Tamir Ottensooser, Tel Aviv (IL); Benjamin Yonatan Asseraf, Tel Aviv (IL)

(*) Notice: Subject to any disclaimer, the term of this patent is extended or adjusted under 35 U.S.C. 154(b) by 795 days.

(21) Appl. No.: 17/100,824

(22) Filed: Nov. 21, 2020

(65) Prior Publication Data

US 2021/0179220 A1 Jun. 17, 2021

Related U.S. Application Data

(60) Provisional application No. 62/938,395, filed on Nov. 21, 2019.

(51) Int. Cl.
*B62J 11/24* (2020.01)

(52) U.S. Cl.
CPC ..................................... *B62J 11/24* (2020.02)

(58) Field of Classification Search
CPC .... E05B 67/00; E05B 67/383; E05B 67/0005; E05B 67/0082; E05B 1/0092; E05B 47/00; E05B 47/0002; E05B 47/0004; E05B 47/0012; E05B 47/063; B60R 25/00; B60R 25/09; B60R 25/093; B60R 25/0225; B60R 25/0227; G07C 9/00; G07C 9/0069; B62J 11/24
See application file for complete search history.

(56) References Cited

U.S. PATENT DOCUMENTS

| 4,653,296 | A | 3/1987 | Kajikawa |
| 2019/0135365 | A1 | 5/2019 | Jesse |
| 2019/0383056 | A1* | 12/2019 | Ouellette ............ E05B 17/2023 |
| 2020/0297059 | A1 | 9/2020 | Viner et al. |

FOREIGN PATENT DOCUMENTS

| CA | 3110411 | A1 * | 3/2020 | ........... E05B 35/008 |
| CN | 233844 | Y | 9/1999 | |
| CN | 109424276 | * | 3/2019 | |
| DE | 102004061359 | | 7/2006 | |
| DE | 102004061359 | A1 * | 7/2006 | ............. B62H 5/001 |
| DE | 102015207282 | A1 | 10/2016 | |
| DE | 202019103766 | U1 | 7/2019 | |
| KR | 101114508 | | 2/2012 | |
| KR | 102117983 | | 6/2020 | |
| KR | 102132411 | B1 | 7/2020 | |

OTHER PUBLICATIONS

E-Scooter Startup Neuron Mobility Extends Series A with USD 12 Mn from Square Peg and GSR Ventures, in, Entrepreneur Asia Pacific, Sep. 30, 2020 (3 Pages).
Qr code waterproof sharing helmet locks for public rental bikes bicycle electric scooter cycling iot safety helmet lock (2 Pages), Date Unknown.
Search Report From Israel Patent Office, dated Apr. 18, 2021 (2 Pages).
Examination Report From Israel Patent Office, dated Apr. 18, 2021 (5 Pages).
English Language Abstract for DE102004061359 (1 Page).
English Language Abstract for KR101114508 (1 Page).

* cited by examiner

*Primary Examiner* — Christine M Mills
*Assistant Examiner* — Yahya Sidky (57) ABSTRACT

The present invention provides an on-vehicle lock for a helmet or other device or apparatus. The lock and the helmet thereon will not obstruct vehicle movement.

18 Claims, 9 Drawing Sheets

ON-VEHICLE HELMET LOCK

CROSS-REFERENCES TO RELATED APPLICATIONS

This application is related to and claims priority from commonly owned U.S. Provisional Patent Application Ser. No. 62/938,395, entitled: On-Vehicle Helmet Lock, filed on Nov. 21, 2019, the disclosure of which is incorporated by reference in its entirety herein.

TECHNICAL FIELD

The present disclosed subject matter is directed to a lock for attachment to a portion of a vehicle, in which a helmet or other structure can be locked.

BACKGROUND OF THE INVENTION

Micro mobility, in the form of electronic and manual scooters, electronic and manual bicycles and motor bikes and motor scooters, is becoming an ever increasing form of transit, and is completing "the last mile" of transit for many people. As the aforementioned vehicles are driven on sidewalks, streets, and roads, users typically voluntarily wear a helmet for safety. Additionally, many jurisdictions require operators of these vehicles to wear a helmet.

As helmets, are forgotten, and or use of one of the aforementioned micro mobility vehicles is typically spontaneous, such that a helmet is needed, wearing a helmet may not be possible. When the jurisdiction has a helmet law, if the vehicle operator is caught without a helmet, they are subject to fines, bans, and other penalties.

While helmet sharing, leaving the helmet with the vehicle has been tried, many helmets are simply stolen. Also, the wearer forgets he has a helmet on and never returns the helmet to the associated micro mobility vehicle.

SUMMARY

The present disclosed subject matter provides an on-vehicle lock for a helmet or other device or apparatus. The lock and the helmet are such that when the helmet is locked, does not obstruct steering or directing the vehicle, vehicle movement, or the user of the vehicle.

Embodiments of the disclosed subject matter are directed to a lock which includes two or more prongs, spaced apart to engage corresponding individual openings in a helmet, to lock the helmet in place on a lock body in a stable manner, without any additional side or rear helmet support or locking members. If desired one or more side or rear support or locking members may be used with the lock, but are not necessary for proper operation of the lock.

Embodiments of the disclosed subject matter are directed to a lock, for a helmet or other device. The lock comprises: a support configured for receiving a helmet; and, a locking member moveable with respect to the support. The locking member includes at least two prongs spaced apart from each other and dimensioned to correspond to spaced apart openings on the helmet. The locking member moveable into: a first position where the at least two prongs are positioned at least proximate to the support, for locking the helmet on the support, and, a second position where the locking member has been moved such that the at least two prongs are at a distance from the platform, where the helmet is unlocked from the support.

Optionally, the lock is such that the at least two prongs includes two prongs.

Optionally, the lock is such that the at least one prong includes an aperture, and the support includes: a slot through which the prong extends into the support, and a locking arm for being moved between the first position, where the locking arm is in the aperture, locking the at least one prong in place, and a disengaged position, where the locking arm is removed from the aperture, allowing the prongs to move out of the support to the second position.

Optionally, the lock is such that the locking member is in communication with the support, and the locking member is moveable between the first position and the second position.

Optionally, the lock is such that the at least one prong includes two prongs.

Optionally, the lock is such the locking arm is controlled by a motor.

Optionally, the lock is such that the motor operates based on signals received from a computerized device.

Optionally, the lock is such that the support is configured for attaching to a structure.

Optionally, the lock is such that the support includes a post of at least one or a bicycle, scooter, or motorcycle.

Embodiments of the disclosed subject matter are directed to a lock, for a helmet or other device. The lock comprises: a body for attaching to a structure, the body including an engagement member movable between an engaged and disengaged position, and a lock bar slideably mounted on the body. The lock bar includes: a first end and a second end, the first end including at least one receiver, for receiving the engagement member, when the engagement member in in the engaged position, such that the lock bar is in a locked position along the body, and, the second end including at least two prongs in a spaced apart arrangement corresponding to the position of apertures on a helmet, the prongs for extending through the openings (or apertures) of the helmet and engaging the helmet, such that when the lock bar has moved to the locked position along the body, the helmet is locked on the body by the engagement of each prong of the at least two prongs.

Optionally, the lock is such that the at least two prongs are arranged on the second end of the lock bar, such that when engaging the openings of the helmet, a portion of the helmet extends over the body.

Optionally, the lock is such that the engagement member includes at least one tab, moveable in and out of the at least one receiver, when the at least one receiver is aligned with the at least one tab.

Optionally, the lock is such that the at least one receiver includes an indentation extending into the lock bar for receiving the at least one tab.

Optionally, the lock is such that the at least one tab includes two tabs on opposite sides of the body, and the at least one receiver includes two receivers, the two receivers disposed on opposite sides of the lock bar which correspond to the opposite sides of the body.

Optionally, the lock is such that the indentation for each of the two receivers is in at least one of a rectangular or square shape.

Embodiments of the disclosed subject matter are directed to a method for locking a helmet (or other device), the helmet including at least one opening. The method comprises: providing a locking apparatus including at least two prongs, spaced apart and dimensioned to correspond to the at least one opening of a helmet, to extend through the at least one opening, and a support, such that the at least two prongs are movable toward and away from the support;

placing the helmet on the support; and, moving the at least two prongs into and through the at least one helmet opening to a positon at least proximate to the support, such that the helmet is locked on the support.

Optionally, the method is such that the at least one opening of the helmet includes at least two openings, and the at least two prongs include two prongs spaced apart from each other and dimensioned to correspond to the at least two openings of the helmet, and the moving the at least two prongs includes moving each of the at least two prongs, into and through a correspondingly located helmet opening, to a positon at least proximate to the support, such that the helmet is locked on the support.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DETAILED DESCRIPTION OF THE DRAWINGS

Embodiments of the present invention provide a lock for an article such as a helmet. The lock is typically for mounting on micro mobility vehicles, such as electric and manual scooters, electric and manual bicycles, motorbikes, motor scooters and motorcycles and the like. The various aspects of the invention will be illustrated herein primarily by reference to non-limiting examples of locks for locking articles such as helmets, but it will be appreciated that the various aspects of the present invention are equally applicable to other technologies where locks for articles are used.

Throughout this document, references to directions and orientations, such as upward, downward, upper, lower, up, down, upward, downward, top, bottom, inward, outward, lateral, front, rear, and the like, are made. These references are exemplary, for describing and explaining the present invention, and embodiments thereof, and are not limiting in any way.

Figures 1, 2:
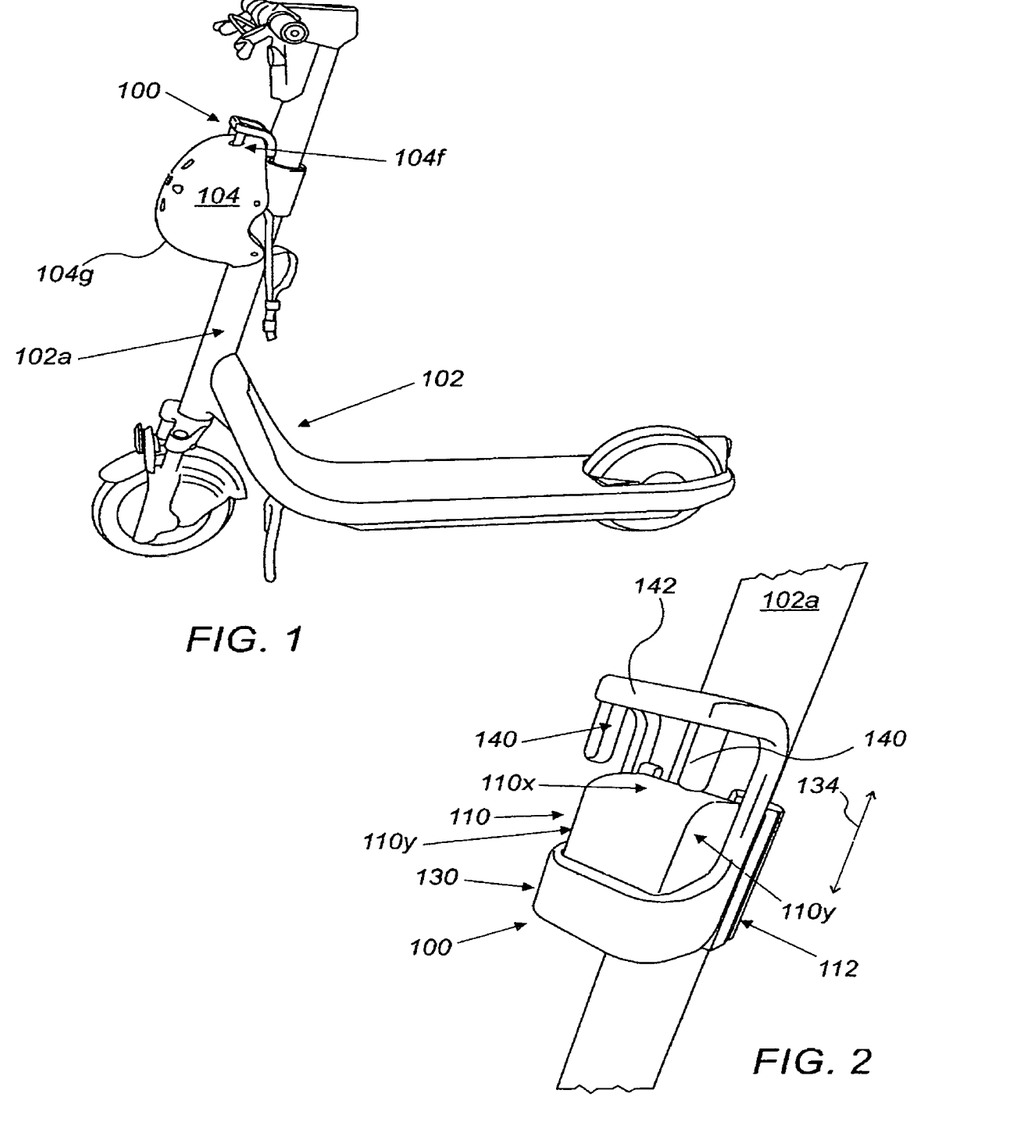
FIG. 1 is a perspective view of the lock of the present invention mounted on a micro mobility vehicle and in use with a helmet.
FIG. 2 is a perspective view of the lock of the present invention.

FIG. 1 shows the lock 100 as mounted on a post or pole 102a of a micro mobility apparatus, such as an electronic scooter 102. The post or pole 102a, for example, supports the steering column for the scooter 102. A helmet 104, for example, at its front portion 104f, is engaged by the lock 100, which is in a locked or engaged position, to lock the helmet 104 at the post 102a. The helmet 104 cannot be removed from the scooter 102, until the lock 100 is in an unlocked or disengaged position (FIG. 7B).

Turning to FIGS. 2 to 5, the lock 100 is formed of a body (lock body) 110, with, for example, one (front) side 110a shaped, e.g., curved or rounded, to receive a portion of the pole 102 of the scooter 100, and to mate with a collar 112, such that when the body 110 and collar 112 are joined together around the pole 102a, the lock 100 is attached to the pole 102a.

The body 110, for example, is symmetric, and includes grooves 116 and apertures 118 along its lateral sides 110y. A support 119, which holds a controller 120 and lock system 122, is received by the body 110 in a cavity, and remains securely in place in the cavity (not shown) of the body 110, by a snap fit or other secure engagement. Locking tabs (LT) 126 (the locking tabs 126 also known as engagement members), controlled by the controller 120, and are part of the lock system 122, extend through the apertures 118. The body 110 may support various sensors (not shown), such as a light sensor for detecting the presence or absence of a helmet (which is locked), when the arm 130 is in the locked position. The body 110 includes a curved upper surface 110x, which, for example, accommodates any inner curvature of the helmet 104, and, for example, serves as a support (support member) for the helmet 104, when the helmet 104 is locked and during the locking and unlocking processes. The body 110, for example, is dimensioned to fit within the cavity 104h of the helmet 104.

Figure 3:
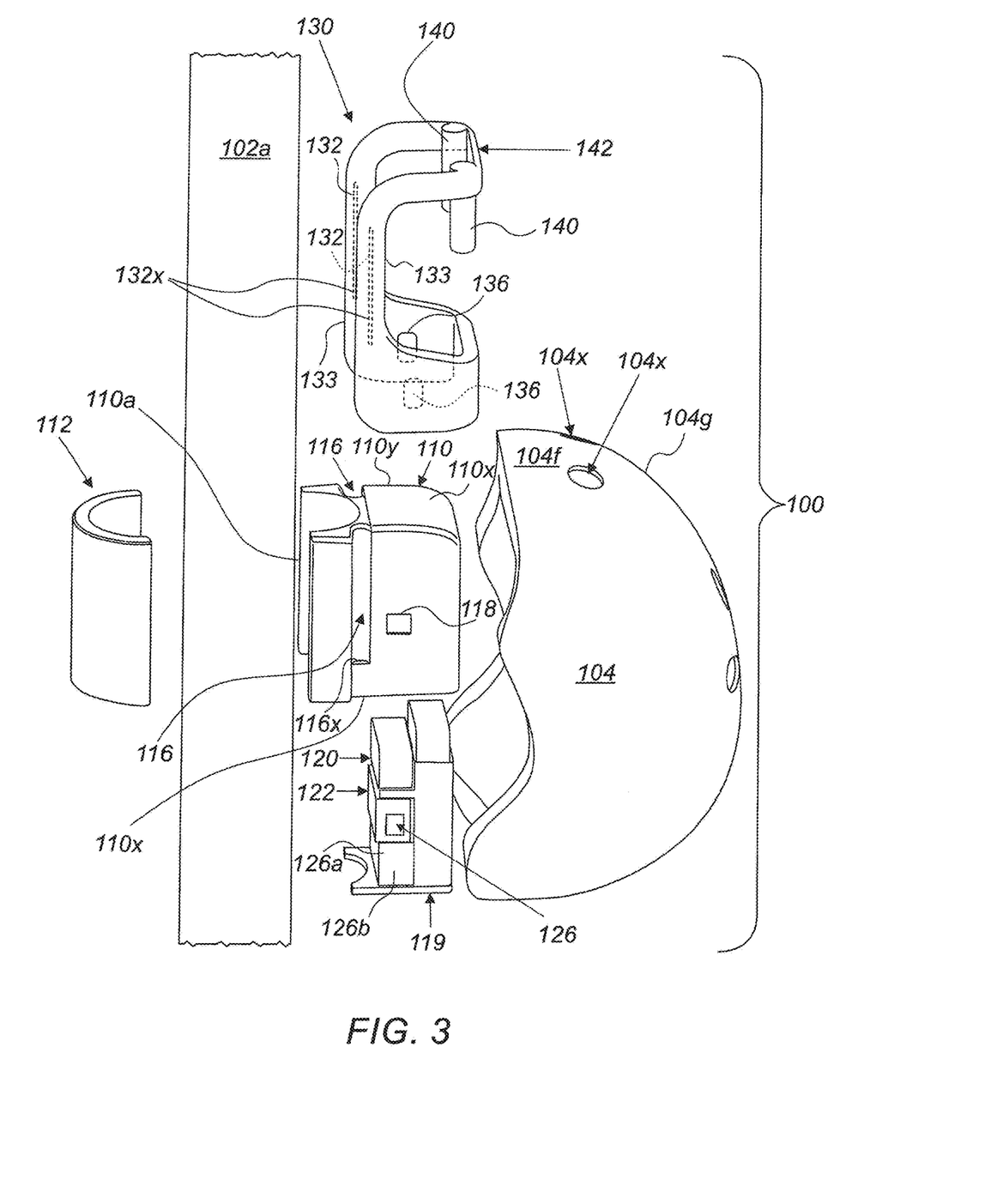
FIG. 3 is an exploded view of the lock of the present invention with the helmet.
Figure 4:
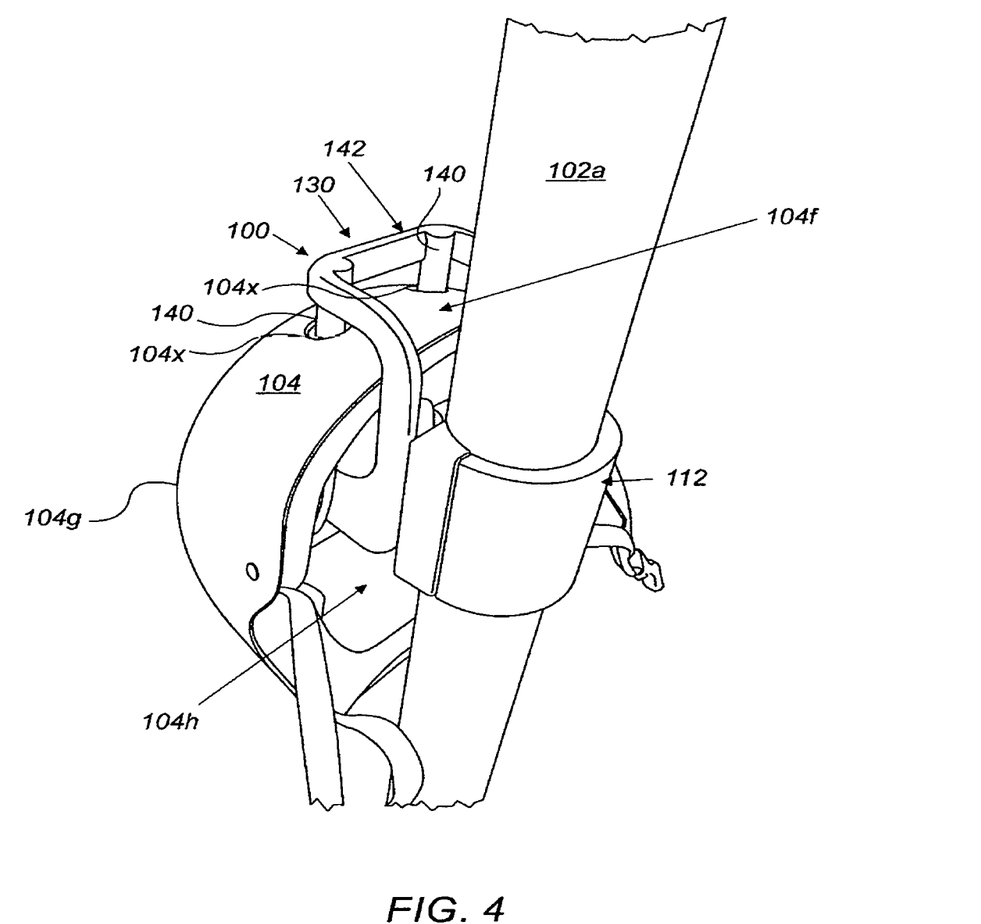
FIG. 4 is a top perspective view of the view of the lock of the present invention.
Figure 5:
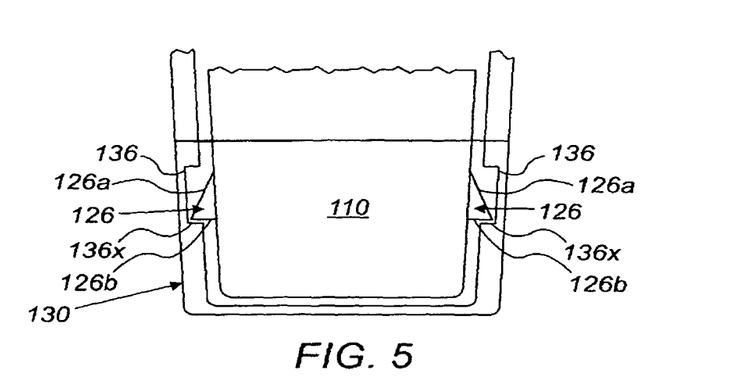
FIG. 5 shows the engagement of a locking tabs in indents of the arm when the arm is locked.

An arm 130 (also known as a lock bar or locking member) is slideably mounted on the body 110. The arm 130 is symmetric, and includes rails 132, on the inner sides of the lateral bars 133 of the arm 130. The respective rails 132, engage the respective grooves 116 of the body 110, allowing the arm 130 to slide axially along the body 110 (in the direction of the double headed arrow 134). The arm 130 includes indents 136, for example, rectangular cube shaped, including square cube shaped, which align with the respective apertures 118 on both of the lateral sides 110y of the body 110, when the arm 130 is in its locked position, where the end (lower) surfaces 132x of each rail 132 abut the shoulder surface 116x of the groove 116 of the body 110. The indents 136 receive the respective locking tabs 126, when the arm 130 is in this lower or locked position. The locking tabs 126, for example, are spring loaded, so that once moved inward (to be retracted, for example, by the motor 220) for unlocking of the arm 130, they are then released (for example, being moved by the motor 220 to the previous position), such that when the arm 130 is returned to the locking position, the locking tabs 126 spring outward into the indents 136 of the arm 130, to lock the arm 130, due to the tapered portions 126a (which are tapered outward, and extend downward) of the locking tabs 126. For example, for one or both of the locking tabs 126, the surface 126b of the locking tab 126 serves as a stop surface for the indent 136, at the lower surface 136x of the indent 136, as shown in FIG. 5. Alternately, one or more of the indents 136 may be apertures extending through the arm 130.

Alternately, the rails 132 may be T-shaped, with the respective groove 116 on the body 110 correspondingly shaped, for additional slideable securement. Also, the rails 132 need only extend a short distance upward, from the bottom of each lateral bar 133, and coupled with a stop shoulder in the groove 116, filling the groove 116 proximate to the upper surface 110x of the body 110, this cooperating structure serves as a travel limit for the arm 130, keeping the arm 130 on the lock 100, and not allowing it to be separated from the body 110.

Posts or prongs 140 (the terms "posts" and "prongs" used interchangeably herein), for example, one or more prongs 140, and for example, typically two prongs 140, extend from a crossbar 142 of the arm 130. The prongs 140 are, for example, of a shape and diameter, suitable for extending into and through openings 104x (the openings 104x also known as apertures) of the helmet 104 (the openings 104x in the shell 104g of the helmet 104, the shell 104g surrounding the helmet cavity 104h (FIG. 4) into which the user's head is placed during use), such as the two spaced-apart openings 104x in the front of the helmet 104. Alternately, the two or more prongs 140 may enter into and extend through a single opening in the front portion 104f of the helmet 104, should the helmet 104 include such a single opening. The prongs 140 are, for example, of a length, such that when the arm 130 is in the locked position, each prong 140 extends into and typically through the openings 104x in the helmet 104, and into contact with the surface (upper surface) 110x of the body 110, or proximate to the surface 110x of the body 110, such that the helmet 104 is locked or otherwise secured on the body 110, in a stable manner, for example, with minimal, if any, movement or "play". For example, the helmet 104 shown may be a Sporting Helmet, Model FCJ-301, from UTS Sport Co. Ltd. of Guangzhou City, China.

The prongs 140, for example, two prongs at a fixed distance, the fixed distance corresponding to the distance between the openings 104x in the helmet 104 (e.g., front portion 104f of the helmet 104), can also be laterally moveable, one or both, along the crossbar 142 so as to be adjustable to different helmet openings, or other structures, such as rings mounted to the helmet or other structures which provide one or more openings. The prongs 140, one or both, may also be extendible and/or contractible (upward and downward), so that the length of each prong 140 can be adjusted, for example, individually or together. While two prongs 140 are shown, as this arrangement of prongs 140 provides a stable mount for the helmet 104, a single prong is also suitable, as are more than two prongs. Alternate embodiments may include multiple prongs, each prong for extending into and through a corresponding opening in the helmet 104 or other device.

Figure 6:
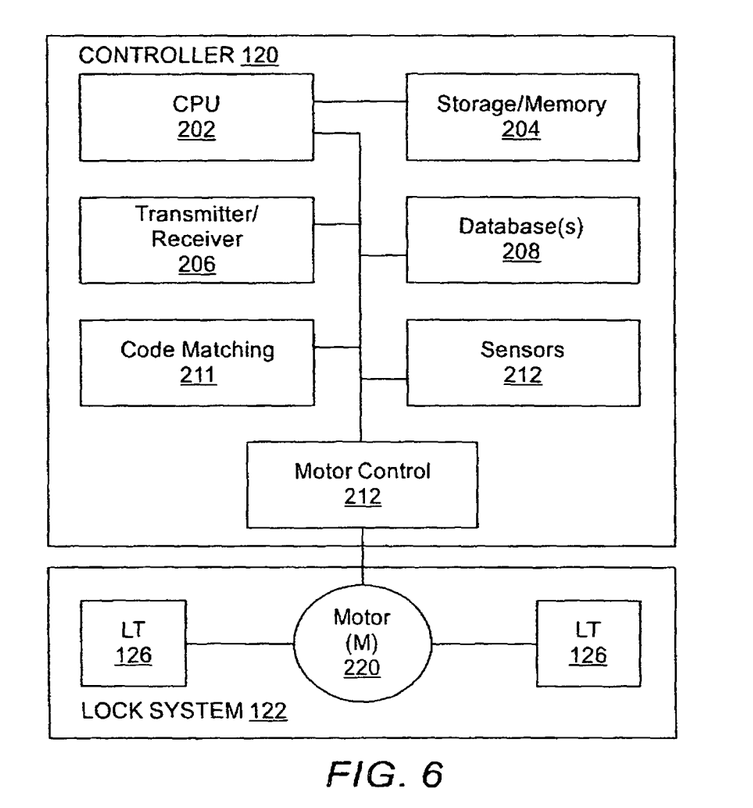
FIG. 6 is a diagram of the control system for the lock of the present invention.

Turning also to FIG. 6 there is shown the architectures of the controller 120 and lock system 122 of the lock 100 as block diagrams. The architecture of the controller includes processors, such as a central processing unit (CPU) 202, which is linked to storage/memory 204, transceivers 206, database(s) 208, and modules 211-213, for code matching 211, sensors 212, and motor control 213. The motor control 213 is linked to the lock system 122, which includes a motor (M) 220 linked to locking tabs (LT) 126. While the most germane components are shown and described, other modules and power supplies (not shown) may be used with the controller 120 and lock system 122. "Linked" as used herein, includes both wired and/or wireless links, either direct or indirect, such that the components 202, 204, 206, 208 and 211-213, and 220 and 126, are in electronic and/or data communications with each other, either directly or indirectly. As used herein, a "module", for example, includes a component for storing instructions (e.g., machine readable instructions) for performing one or more processes, and including or associated with processors, e.g., the CPU 202, for executing the instructions.

The CPU 202 is formed of one or more processors, including hardware processors, and performs the processes (methods) of the lock 100. These processes may be in the form of programs, algorithms and the like, performed by the CPU 202. For example, the processors of the CPU 202 may include x86 Processors from AMD (Advanced Micro Devices) and Intel, Xenon® and Pentium® processors from Intel, as well as any combinations thereof.

The storage/memory 204 stores machine-executable instructions executed by the CPU 202 for performing the processes of the lock 100. The storage/memory 204, for example, also provides temporary storage for data.

The transmitter/receiver or transceiver 206 communicates with a controlling device, such as a smartphone, to unlock the arm 130, to unlock the helmet 104, by Bluetooth®, Wi-Fi®, Internet, or the like.

The database(s) 208 store various data such as codes associated with the various users to unlock the lock when and entered code (from a user device) matches a stored and active code of the database 208. This determination of matching is made by the code matching module 211.

The sensors module 212, for example, detect whether the helmet is present in the lock 100, when the arm 130 is locked.

The motor control module or motor controller 213, controls the motor 220, which controls the locking tabs 126. For example, the locking tabs are moved inward by the motor (M) 220, when unlocking of the helmet 104 is desired, by allowing the arm 130 to move outward, typically upward, to an unlocked or second position, such that the prongs 140 clear (extend above, so as to extend beyond) the helmet 104, allowing the helmet 104 to be removed from the lock 100.

Figure 7A:
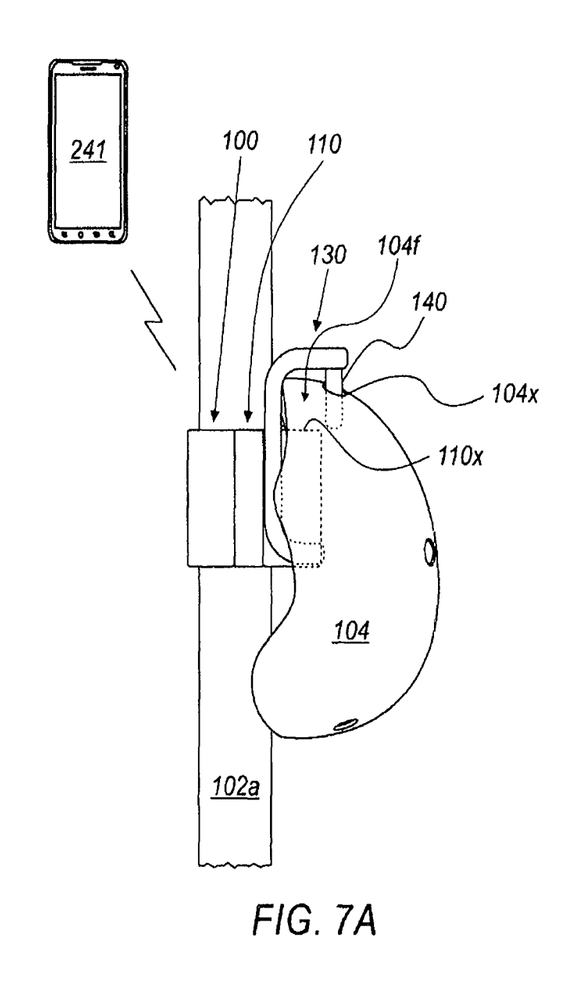
FIGS. 7A and 7B are side views of the lock of the present invention in operation with a helmet.
Figure 7B:
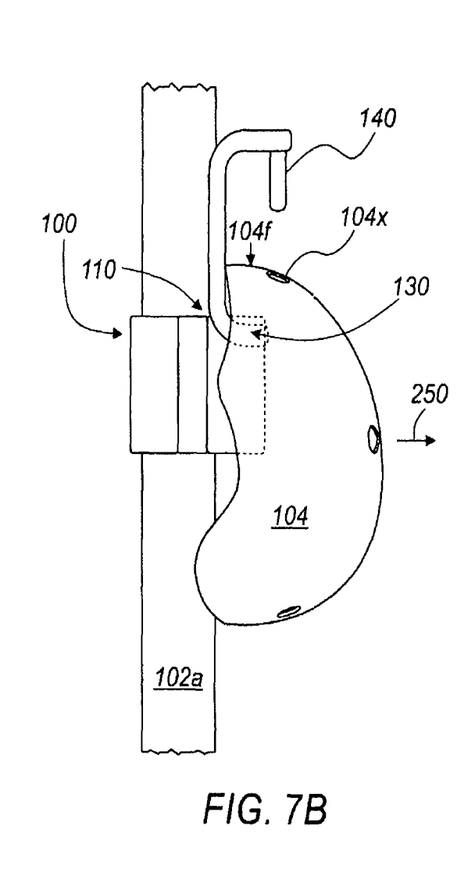

FIGS. 7A and 7B show an operation of the lock 100 on a scooter (post 102a) locking a helmet. Initially, as shown in FIG. 7A, the helmet 104 is locked by the lock 100, as the prongs 140 extend though the openings 104x of the helmet 104, to at least proximate to the (upper) surface 110y of the body 110. The arm 130 is in the first, lower, or locked position along the body 110, as the rails 132 (in the grooves 116) are such that their end (lower) surfaces 132x abut the shoulder surface 116x of the respective groove 116, and the locking tabs 126 extend into the indents 136 of the arm 130.

A device, such as a smart phone 241, or other computerized device, associated with a user who has an active code for the scooter 100, sends the code, for example, via Bluetooth®, to the controller 120 of the body 110. Should the transmitted code match a stored active code, the CPU 202, via the motor controller 213, signals the motor 220, to move the locking tabs 126 inward, freeing the arm 130, allowing the arm 130 to be moved or move axially (upward)

to a second or unlocked position, as shown in FIG. 7B. Additionally, the device 241 may run an application (APP) which interfaces with the lock 100.

In the second or unlocked position, the arm 130 is movable axially (upward) to a point where the posts 140 clear the helmet 104, or the arm 130 can be moved so as to be separated from the body, allowing for the helmet 104 to be removed from the lock 100 (e.g., the helmet 104 moved away from the lock 100, as indicated by the arrow 250). With the helmet 104 removed, the arm 130 can be reconnected to the body 110, if necessary, and moved axially) downward to the first or locking position, where once the indents 136 align with the apertures 118, the locking tabs 126 will reengage the indents 136, locking the arm 130 on the body (as shown in FIGS. 3 and 5).

Alternately, should the codes not match, the arm 130 is not permitted to be moved, and remains in the locked position.

While a helmet 104 has been shown with openings 104x positioned at locations on the helmet 104 (e.g., the front of the helmet 104) corresponding to the positions of the prongs 140 on the crossbar 142, the helmet 104 could also include a single opening for accommodating one or both prongs 140, or an attachment, such as a ring structure, for accommodating the prongs 140, so as to lock the helmet 104 on the body 110, by the arm 130, in accordance with that detailed above.

Also, the lock 100 may be used for locking other structures, articles and the like, such as those with openings, attached rings, and the like.

Figure 8A:
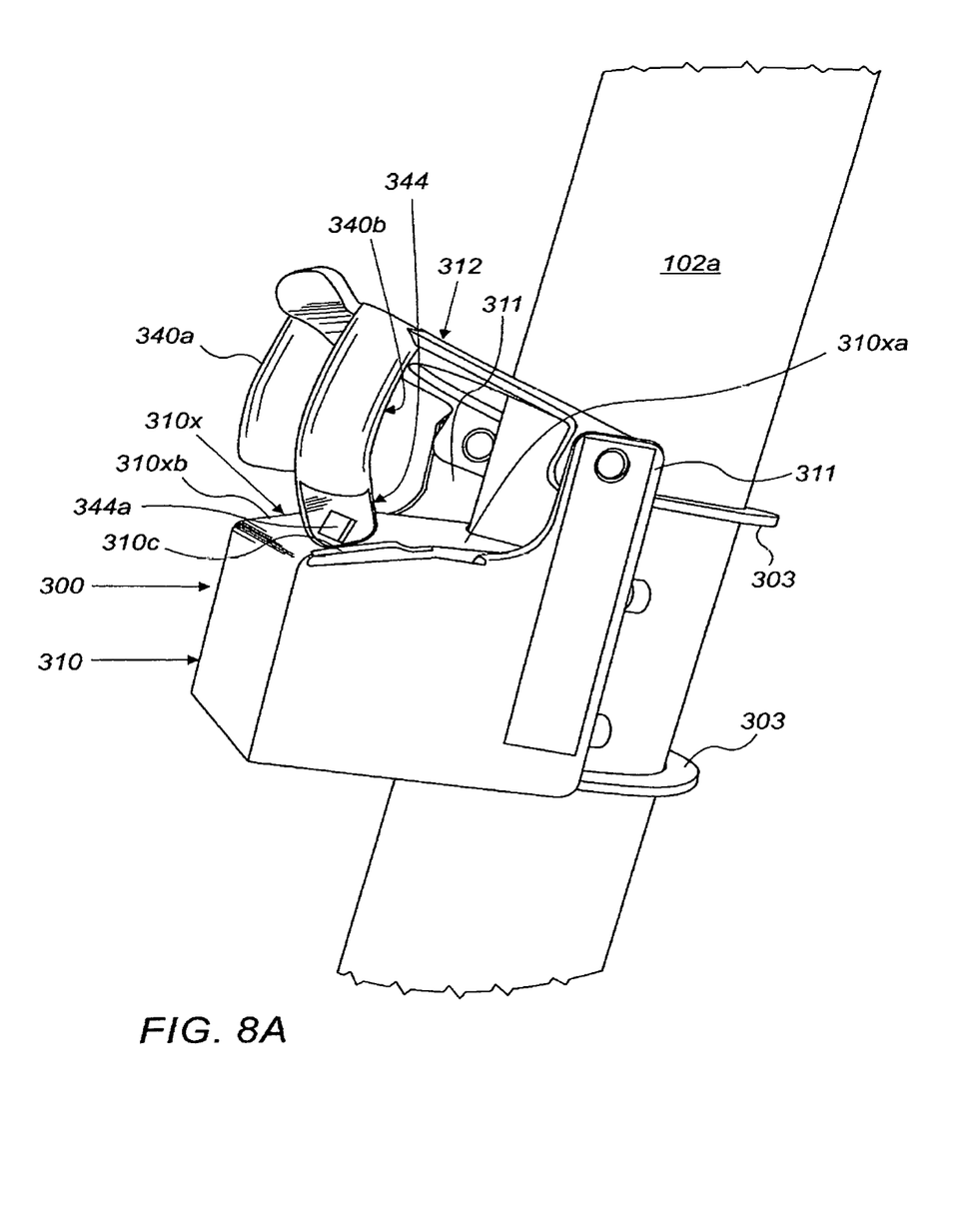
FIG. 8A is a perspective view of another embodiment of the lock of the disclosed subject matter, mounted on a vehicle.

FIG. 8A shows another lock 300, similar to the lock of FIGS. 1-7B, with identical or similar components having elements numbers in the 300's and are in accordance with the descriptions above. This lock 300 is also controlled, for example, by the controller 120 detailed above. The lock 300 is shown mounted on a pole 102a of a scooter (identical or similar to the scooter 102), by collar members 303. The collar members 303 are adjustable to the dimensions of the pole 102.

Figure 8B:
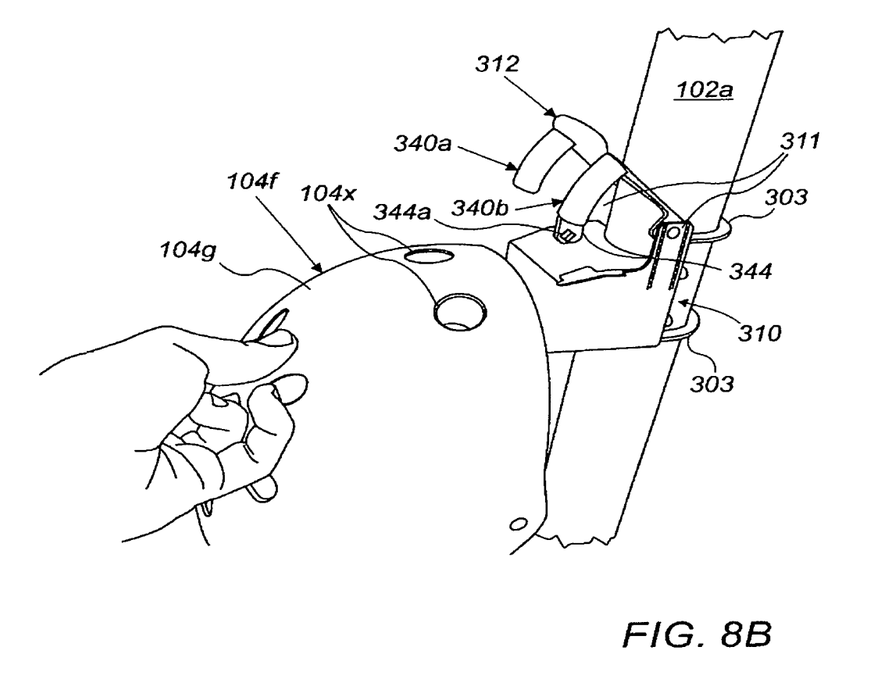
FIG. 8B shows a helmet in use on the lock of FIG. 8A.

The lock 300 includes a lock body 310. The lock body 310 is, for example, similar to body 110, detailed above. The body 310 includes an upper surface 310x, and along the surface portion 310xb, which, for example, supports the helmet 104 (the body 310 serving as a support or support member for the helmet 104), when the helmet 104 is locked, and during the locking and unlocking processes. The body 310, for example, is dimensioned to fit within the cavity 104h of the helmet 104, as shown in FIG. 8B. In FIG. 8B, the prongs 340a, 340b are outside of the helmet 104, such that the helmet 104 may be removed by the user 301 from the lock body 310, or the helmet 104 is placed onto the lock body 310, such that the prongs 340a, 340b will be moved into the openings 104x of the helmet 104, by moving the rounded member 312 downward, to lock the helmet 104 on the lock body 310, the locking (and unlocking) of the lock 300, for the helmet 104 or other device, detailed further below.

The lock body 310 includes oppositely disposed protruding flanges 311, which receive a rounded (e.g., U-shaped) member 312 (the rounded member also known as a handle or locking member), in a moveable hinged attachment. The hinged engagement may be biased, e.g., spring biased, whereby when the spring relaxes, the rounded member 312 moves away from the lock body 310, such that the helmet 104 may be removed from the lock body 310, or placed onto the lock body 310 for locking.

Two prongs 340a, 340b, for example, are attached to the rounded member 312. Based on the hinged attachment of the rounded member 312 to the lock body 310, the rounded member 312, and therefore, the prongs 340a, 340b can be moved into and out of a locked and unlocked position, and therefore, a locked and unlocked engagement with the helmet 104. The prongs 340a, 340b are of different lengths, with, for example, one prong 340 shorter than the other prong 340b, with the shorter prong 340a of a length to abut or be in close proximity to the lock body upper surface 310x, a portion 310xb which is, for example, angled downward from the flat portion 310xa, when the helmet 104 is locked by the lock 300 (e.g., the rounded member 312 is in the locked position, and the helmet 104 is, for example, seated on the lock body 310 (which serves as a support or support member)). The longer prong 340b is of a length to extend through a slot 310c in the lock body 310, to lock the lock 300 (in the body 310) or the helmet 104 (on the lock body 310 on its upper surface 310x). The longer length prong 340b terminates in a protrusion 344. The protrusion 344 forms, for example, the extended (longer) length of the prong 340b, this longer prong 340b, for example, at the protrusion 344, includes an aperture 344a (e.g., rectangular, including square shaped), through which as locking arm (or locking bar) 346 (of the lock mechanism 347) in the lock body 310 can extend through (FIG. 9B), when locking of the lock 300 or the helmet 104 or other device is desired. The prongs 340a, 340b are, for example, spaced apart from each other at a fixed distance, the fixed distance corresponding to the distance between the openings 104x in the helmet 104 (e.g., front portion 104f (FIGS. 3, 4, 6A and 6B) of the helmet 104). The prongs 340a, 340b may be such that the distance between them is adjustable on the rounded member 312, or the like, to fit various helmet front opening arrangements.

Figure 9A:
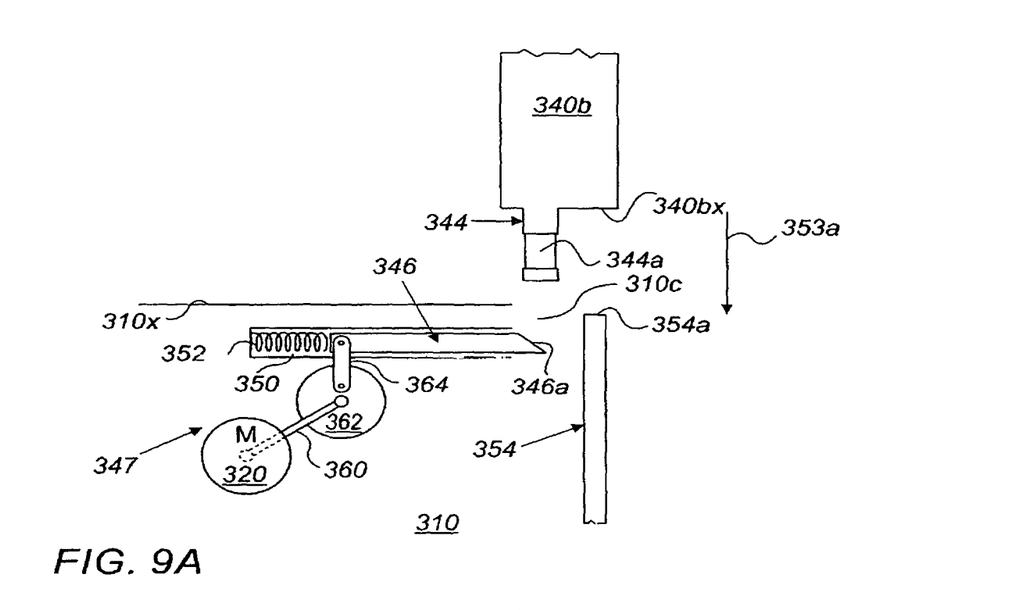
FIGS. 9A to 9C are diagrams of the locking and unlocking of the lock of FIG. 8A; and, FIG. 10 is a diagram of the lock body of the lock of FIGS. 8A, 9A, 9B and 9C, showing a sensor and controller arrangement.
Figure 9B:
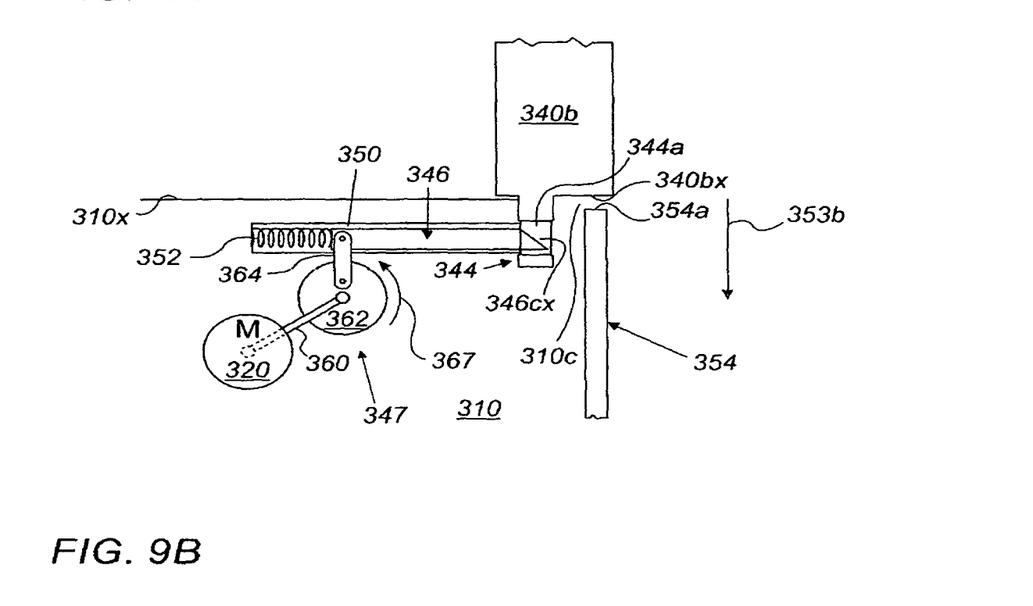
Figure 9C:
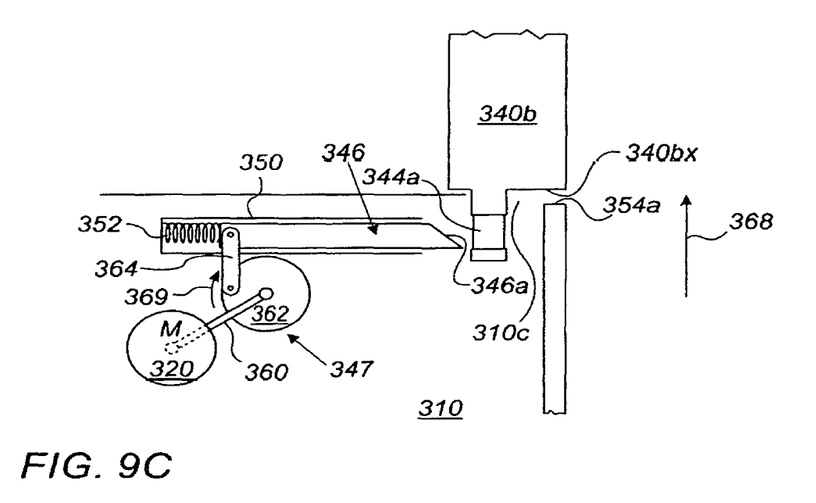

FIGS. 9A-9C show the locking of the lock 300 within the lock body 310 (including the locking mechanism 347). FIG. 9A shows the protrusion 344 on the prong 340b being moved downward, through the slot 310c, toward the locking arm 346. FIG. 9B shows the locking arm 346 engaged in the aperture 344a of the protrusion 344, thus locking the rounded member 312 (and the helmet 104), in a locking or locked position. FIG. 9C shows the locking arm 346 disengaged and clear of the aperture 344a of the protrusion 344, allowing the rounded member 312 to be moved upward, to an unlocked position, where the helmet 104 is unlocked, and may be removed from the lock 300 for use.

Figure 10:
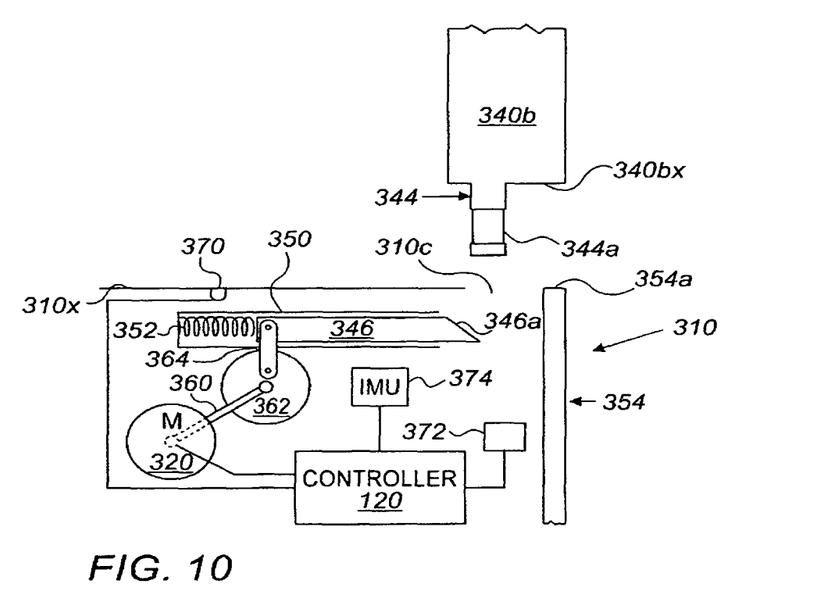

In FIGS. 9A, 9B and 9C, the lock mechanism 347, in the lock body 310, is shown in detail. The locking arm 346 is slideable laterally in a channel 350. The locking arm 346 is biased, for example, by a spring 352, that when in a relaxed position, as shown in FIGS. 9A, 9B and 10, the biasing allows the protrusion 344, by its downward movement (in the direction of the arrow 353a, in FIG. 9A), to push on the outwardly tapered end 346a of the locking arm 346 inward, until the aperture 344a aligns with the tapered end 346a (of the lock bar 346). The aperture 344a, now aligned with the locking arm 346, allows the locking arm 346, at its tapered end 346a, to move outward and enter the aperture 344a, as pushed by the spring 352, as the spring 352 returns to its relaxed position, where a locking engagement or locked position occurs, as shown in FIG. 9B. For example, the tapered end 346a of the locking arm 346 extends at least into the aperture 344a, and typically extends through, and typically beyond the aperture 344a, as a result of the spring 352 biasing. Additionally, the aforementioned alignment, and further downward movement of the prong 340b (in the direction of the arrow 353b in FIG. 9B) is prevented by the edge 354 of the lock body 310, serving as a stop surface and travel limit for the prong 340b, due to the lock body edge 354 being aligned with the surface 340*bx* of the prong 340*b*. When in the locking position, the surface 340*bx* typically abuts the edge surface 354*a* of the lock body edge 354, but may also be in close proximity thereto, depending on the construction of the prong 340*b*.

The locking arm 346 is moved between the locking and unlocking positions by a motor M 320, controlled, for example, by signals from the CPU 202 and/or motor controller 213 (FIG. 2), which are typically activated to signal the motor M 320, upon receiving signals from a device, such as a smartphone 241 or other computer, or computerized device (similar to that discussed for the lock 100 above). The motor M 320 is mounted to a shaft 360, which in turn, mounts to a plate 362 (e.g., a circular plate), which is movably (e.g., rotatably) mounted to a pull bar 364, at one end of the pull bar 364. The other end of the pull bar 364, is movably (e.g., rotatably) mounted to the lock bar 346. When the motor M rotates, such that the plate 362 rotates, for example, approximately 90 degrees (as per the arrow 367 of FIG. 9B), the locking arm 346 is moved inward, moving out of, and past, the aperture 344*a*, as shown in FIG. 9C, allowing the locking ring 310 and the prongs 340*a*, 340*b* to be moved upward (in the direction of the arrow 368 in FIG. 9C), either manually or by spring biasing, to free the helmet 104 from the lock body 310, such that the helmet 104 is removable from the lock body 310 for use (by the user).

With the unlocking complete, the motor M may rotate the plate 362 approximately 90 degrees (in the direction of the arrow 369 in FIG. 9C), back to its starting position (shown, for example in FIGS. 9A and 9B), such that the locking arm 346 moves outward, as the spring 352 relaxes (from its contracted position shown in FIG. 9C), to the starting position, as shown in FIG. 9A. Locking the helmet 104 on the lock body 310 may begin again.

Alternately, a sensor 370, such as a light sensor, may be placed on, or extend through the surface 310*x* of the lock body 310, as shown in FIG. 10. The light sensor 370 works in conjunction with a sensor 372 for detecting locking of the locking arm 346 through the aperture 344*a* (the locked position), a motion sensor or Inertial Measurement Unit (IMU) 374, which, for example, includes an accelerometer, gyrometer, and a magnetometer, and the CPU 202. All of the aforementioned sensors are part of the sensors 212 of the controller 120, and the electrical and/or data connections between sensors 370, 372, 374 and the controller 120 are shown in FIG. 10. The sensor 370 functions to detect the presence or absence of a helmet 104, locked on the lock body 310, once the locking arm 346 is in the locked position (as determined by the locking sensor 372), and the motion sensor (IMU 374) has determined that there is no motion of the vehicle (e.g., scooter 102) for a predetermined time period. When all conditions are met, the transmitter 206 will send a signal to the user's device, e.g., smartphone 241, computer or computerized device, that the helmet 104 is not present on the lock body 310 (and the user is responsible for its loss).

Alternately, the lock 300 may be constructed, such that the locking mechanism 347 accommodates two prongs, each prong identical or similar to the longer prong 340*b*, for extending into the lock body 310, through oppositely disposed slots 310*c* on the body 310 (at the sides), with each prong (extending through the respective slot 310*c*) into the body 310, for locking in the lock body 310, as oppositely disposed locking arms 346 extend through the respective apertures 344*a* in each of the prongs 340*b*, as detailed for the lock 300 above. In other alternates, the two long prongs, may be part of a member, which includes the prongs, e.g., the two or more prongs. The member, via the prongs, such that the prongs extend into and through the respective openings of the device, e.g., helmet, and attach to the lock body 310 during locking (e.g., locking arms engage each prong aperture). The member is a separate structure from the body, and removable from the lock body, when the helmet 104 is released from the locking for use, or when the helmet is returned to the lock, for relocking thereon or reengagement on the lock body, when helmet use is finished.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:
1. A lock comprising:
a body configured for receiving a helmet; and,
a locking member moveable with respect to the body, the locking member including at least two prongs spaced apart laterally from each other and dimensioned to correspond to spaced apart openings of the helmet, the locking member moveable into:
a first position where the at least two prongs each extend into the corresponding spaced apart opening of the helmet to a location at least proximate to a surface of the body, for locking the helmet on the body; and,
a second position where the locking member has been moved such that the at least two prongs are each at a distance from the surface of the body, where the helmet is unlocked from the body.
2. The lock of claim 1, wherein the at least two prongs includes two prongs.
3. The lock of claim 1, wherein:
at least one prong of the at least two prongs includes an aperture, and
the body includes:
a slot through which at least the aperture of the at least one prong extends into the body, and
a locking arm for being moved between an engaged position, where the locking arm is engaged in the aperture, locking the at least one prong in place in the first position, and a disengaged position, where the locking arm is removed from the aperture, allowing the at least two prongs to move away from the body to the second position.
4. The lock of claim 3, wherein the locking member, is in communication with the body, and the locking member is moveable between the first position and the second position.
5. The lock of claim 3, wherein the at least one prong including the aperture includes two prongs.
6. The lock of claim 3, wherein the locking arm is controlled by a motor.
7. The lock of claim 6, wherein the motor operates based on signals received from a computerized device.
8. The lock of claim 1, wherein the body is configured for attaching to a structure of a vehicle.
9. The lock of claim 8, wherein the vehicle includes at least one of a bicycle, scooter, or motorcycle.
10. The lock of claim 9, wherein the structure of the vehicle includes a steering column post of the vehicle.
11. A lock comprising:
a body configured for receiving at least a portion of an inner cavity of a helmet, and for attaching to a structure, and, the body including an engagement member movable between an engaged position and a disengaged position; and, a lock bar slideably mounted along the body, the lock bar including a first end and a second end:

the first end including at least one receiver, for receiving the engagement member, when the engagement member is in the engaged position, such that the lock bar is in a locked position along the body, and, the second end including at least two prongs in a laterally spaced apart arrangement corresponding to the position of apertures on the helmet, each of the at least two prongs of a length for extending through the apertures of the helmet to at least proximate to the body and into a locking position, such that the helmet is engaged with respect to the body, such that when the lock bar has moved to the locking position along the body, the helmet is locked and/or unlocked on the body by the engagement member moving between the engaged position, where the engagement member is in the at least one receiver, such that the lock bar is locked with respect to the body, where movement of the lock bar along the body is inhibited, and the disengaged position, where the engagement member is out of the at least one receiver, such that the lock bar is unlocked with respect to the body, where the lock bar is moveable along the body.

12. The lock of claim 11, wherein the at least two prongs includes two prongs.

13. The lock of claim 11, wherein the engagement member includes at least one tab, moveable in and out of the at least one receiver, when the at least one receiver is aligned with the at least one, when the lock bar is to be locked or unlocked with respect to the body.

14. The lock of claim 13, wherein the at least one receiver includes an indentation extending into the lock bar for receiving the at least one tab.

15. The lock of claim 14, wherein the at least one tab includes two tabs on opposite sides of the body, and the at least one receiver includes two receivers, the two receivers disposed on opposite sides of the lock bar which correspond to the opposite sides of the body.

16. The lock of claim 15, wherein the indentation for each of the two receivers is in at least one of a rectangular or square shape.

17. A method for locking a helmet comprising:

providing a locking apparatus onto a structure of vehicle, the locking apparatus including at least two prongs, spaced apart laterally from each other, and said each prong dimensioned to correspond to at least one opening of at least two spaced apart correspondingly dimensioned openings of the helmet, and of a length to extend through each respective opening, and a body, such that each of the at least two prongs are movable toward the body, so as to lock the helmet on the body, and away from the body, to unlock the helmet from the body;

placing the helmet on the body; and, moving the at least two prongs into and through a corresponding opening of the at least two openings of the helmet, to a position at least proximate to the body, such that the helmet is locked on the body.

18. The method of claim 17, wherein the at least two prongs include two prongs.

* * * * *